United States Patent
Malmberg et al.

(10) Patent No.: US 10,246,259 B2
(45) Date of Patent: Apr. 2, 2019

(54) FLEXIBLE FUNNEL ELEMENT FOR MATERIAL GUIDE CHUTE

(71) Applicant: SANDVIK INTELLECTUAL PROPERTY AB, Sandviken (SE)

(72) Inventors: Mats Malmberg, Rydsgard (SE); Adrien Henssien, Malmo (SE)

(73) Assignee: SANDVIK INTELLECTUAL PROPERTY AB, Sandviken (SE)

(*) Notice: Subject to any disclaimer, the term of this patent is extended or adjusted under 35 U.S.C. 154(b) by 0 days.

(21) Appl. No.: 15/742,872

(22) PCT Filed: Jul. 9, 2015

(86) PCT No.: PCT/EP2015/065659
§ 371 (c)(1),
(2) Date: Jan. 8, 2018

(87) PCT Pub. No.: WO2017/005325
PCT Pub. Date: Jan. 12, 2017

(65) Prior Publication Data
US 2018/0186573 A1    Jul. 5, 2018

(51) Int. Cl.
*B65G 11/10* (2006.01)
*B65G 11/18* (2006.01)

(52) U.S. Cl.
CPC ............ *B65G 11/10* (2013.01); *B65G 11/106* (2013.01); *B65G 11/18* (2013.01); *B65G 11/186* (2013.01)

(58) Field of Classification Search
CPC ....... B65G 11/146; B65G 11/14; B65G 11/08; B65G 11/083; B65G 11/186

USPC ........................................ 193/15, 25 C, 25 E
See application file for complete search history.

(56) References Cited

U.S. PATENT DOCUMENTS

| | | | |
|---|---|---|---|
| 2,095,494 A * | 10/1937 | Dobbs | B65G 11/146 193/6 |
| 2,997,150 A * | 8/1961 | Emanuelson | B65G 11/146 193/16 |
| 3,684,072 A | 8/1972 | Castrellon | |
| 4,727,913 A | 3/1988 | Bliss | |
| 4,750,602 A | 6/1988 | Souda | |
| 4,889,219 A | 12/1989 | Key | |
| 7,036,647 B2 * | 5/2006 | Malmberg | B65G 11/146 193/25 C |
| 9,272,846 B2 * | 3/2016 | George | B65G 11/026 |
| 2006/0064863 A1 | 3/2006 | Grata | |
| 2009/0139828 A1 | 6/2009 | Burstrom et al. | |

(Continued)

FOREIGN PATENT DOCUMENTS

| | | |
|---|---|---|
| CN | 1097396 A | 1/1995 |
| CN | 203173259 U | 9/2013 |
| DE | 3143922 A1 | 7/1982 |

(Continued)

*Primary Examiner* — James R Bidwell
(74) *Attorney, Agent, or Firm* — Corinne R. Gorski (57) ABSTRACT

A flexible funnel element attachable to a holder funnel element to form a funnel section of a material guide chute. The funnel elements include releasable connections to able the flexible elements to be interchanged at the holder elements when worn. Due to the modular construction of the funnel sections, the guide chute has component parts of different materials such that selected components may be optimized for wear resistance and maintaining the free flow of material through the chute.

15 Claims, 9 Drawing Sheets

(56) References Cited

U.S. PATENT DOCUMENTS

2013/0126294 A1* 5/2013 George ............... B65G 11/026
                                                  193/2 A

FOREIGN PATENT DOCUMENTS

| DE | 8618197 U1 | 9/1986 |
| DE | 29621179 U1 | 3/1997 |
| DE | 202004003558 U1 | 7/2004 |
| EP | 329001 A1 | 8/1989 |
| KR | 20100054269 A | 5/2010 |
| WO | 2005042383 A1 | 5/2005 |

* cited by examiner

FLEXIBLE FUNNEL ELEMENT FOR MATERIAL GUIDE CHUTE

RELATED APPLICATION DATA

This application is a § 371 National Stage Application of PCT International Application No. PCT/EP2015/065659 filed Jul. 9, 2015.

FIELD OF INVENTION

The present invention relates to a flexible funnel element to form part of a material guide chute.

BACKGROUND ART

The processing of bulk material typically involves transfer of the material between processing units and to transport vehicles and stock pile locations. Guide chutes represent a convenient conduit through which to direct material when falling generally vertically to a desired destination. Material chutes also find application within construction sites, especially for large buildings to convey debris material to the ground safely.

Generally, chutes are formed from a series of conical funnel sections each having a smaller diameter outlet and a larger diameter inlet to allow the sections to overlay one another and provide a telescopic assembly in use that may be collapsed axially for storage and transport when not in use. Example material guide chutes are described in CN 203173259; KR 2010-0054269; US 2006/0064863; DE 202004003558; DE 29621179; CN 1097396; EP 329001; U.S. Pat. No. 4,889,219; EP 304020; DE 8618197; U.S. Pat. No. 4,727,913; and DE 3143922.

However, conventional funnel arrangements are disadvantageous for a number of reasons. In particular, each funnel section typically requires a degree of stiffness (or rigidity). This structural rigidity is required due to the conventional mechanism for mounting the funnel sections together axially to form the chute. Accordingly, the sections are typically formed from a rigid material or include stiffening reinforcements that appreciably limit adjustability, increase the likelihood of the chute becoming blocked by the material, are subject to accelerated wear and increase manufacturing complexity. Accordingly, what is required is funnel part for a material guide chute to direct a flow of material that addresses the above problems.

SUMMARY OF THE INVENTION

It is an objective of the present invention to provide a funnel element to form part of a funnel section of a material guide chute capable of functioning as a wear part that may be readily interchanged and accordingly conveniently mounted and decoupled at the funnel section and the guide chute to reduce manufacturing complexity relative to existing funnel sections. It is a further specific objective to provide a flexible funnel element configured to reduce the likelihood of blockage by the localised accumulation of material within the guide chute during use. It is a yet further objective to provide a funnel section offering an extended service lifetime over existing arrangements.

The objectives are achieved by providing a flexible funnel element to form part of a funnel section at a guide chute that is more flexible than a corresponding holder funnel element to which the flexible funnel element is attached. Due to the mechanism by which the flexible element is axially coupled to the holder element, the present material funnel section and guide chute are optimised to allow component parts of different materials to be interconnected such that each part is, in turn, optimised for its particular function. In particular, forming the flexible element from a first material or material composition that is different to that of a holder element facilitates recycling as composite reinforced structures are avoided. Additionally, the flexible element comprises a hardness and a stiffness that is appreciably less than the holder element to provide a wear part that is lightweight for ease of handling and that may be readily folded and conveniently packaged for transport before, during and after use. The present funnel section is also optimised for extending the service lifetime of the component parts in particular the flexible element that is capable if flexing considerably during use to avoid abrasive wear, damage and material build-up.

Accordingly to a first aspect of the present invention there is provided a flexible funnel element to form part of a funnel section of a material guide chute, the funnel element mountable at a holder funnel element forming part of the funnel section and comprising: a flexibility and an axial length greater than the holder funnel element; a radial facing surface positionable against a radial facing surface of the holder funnel element to allow the flexible funnel element and the holder funnel element to be interconnected axially to form the funnel section; and at least one connection element to radially engage a cooperative connection element at the holder funnel element to releasably attach the flexible funnel element to the holder funnel element.

Preferably, a radially inward facing surface of the flexible funnel element is positionable against a radially outward facing surface of the holder funnel element to allow the funnel elements to be interconnected axially. In particular, the flexible funnel is configured for positioning around the holder funnel such that the holder funnel provides an internal skeleton or structural support for the deformable flexible funnel. Such an arrangement is advantageous to provide quick and convenient mounting of the flexible funnel at the holder funnel and to protect the flexible funnel at the inlet region as material is fed into each funnel section from the funnel section positioned immediately above. Accordingly, the internally mounted holder funnel maintains the conical shape profile of the outer flexible funnel that may otherwise distort in contact with the bulk material as it falls under gravity.

Optionally, the connection element comprises a plurality of holes formed through the flexible funnel element to receive a plurality of projections extending radially at the holder funnel element. The holes and projections represent a convenient mechanism for releasable connection of the two funnel elements and in particular to allow the radially outer flexible funnel to be slid over the internally mounted holder funnel. In one embodiment, the respective funnel elements comprise between 4 to 10, 5 to 9 or 6 to 8 holes and projections. These types of connection elements also facilitate manufacturing of the respective funnel elements and avoids complicated assemblies.

Preferably, the flexible funnel element comprises an inlet end axially separated from an outlet end, a diameter of the inlet end being greater than a diameter of the outlet end. Preferably, the holder funnel element comprises an inlet end axially separated from an outlet end, a diameter of the inlet end being greater than a diameter of the outlet end; wherein a diameter of the inlets of the flexible and holder funnel elements are substantially equal to allow the funnel elements to be connected together at or towards the axial position of the inlets. Such a configuration is advantageous to allow the inlets of the respective funnel elements to be co-aligned axially and in particular to mount the flexible funnel element externally around and about the internally mounted support or holder funnel element. Due to the relative difference in the axial lengths of the two funnel elements, the majority, and in particular, over half of the axial length of the flexible funnel element, is suspended and exposed below the holder funnel element to define a conical material contact section. The relative axial shortness of the holder element is advantageous to avoid contact with the bulk material and to avoid material adhering to the inside surface of the more rigid holder element. Preferably, the flexible funnel element and/or the holder funnel element comprise a truncated cone shape profile. Alternatively, the funnel elements may comprise any generally funnel-shaped profile providing the inlet ends of the funnel element comprise the same dimensions with respect to inlet diameter.

Optionally, an angle by which a wall of the cone extends relative to a longitudinal axis of the funnel element is in the range 3 to 30°, 5 to 20°, 6 to 18°, 8 to 14° or 10 to 13°. The taper angle of the cones represents a balance between containing the material within the guide chute via a control material flow path and ensuring material is free flowing through the funnel sections to minimise the occurrence of blockages.

Preferably, the flexible funnel element may comprise a Shore A hardness of 30 to 100°; 40 to 90°; 50 to 80°. Optionally, the holder element comprises a Shore D hardness of 40 to 60° or 45 to 55°. Accordingly, the flexibility of the radially outer cone element is greater than that of the radially inner support or holder funnel element. The flexibility of the outer wear cone protects the funnel section against abrasive contact with the material falling through the chute. The flexibility of the wear cone also minimises the risk of abnormally large objects becoming stuck within the chute, for example in a case of an upstream machine breakdown resulting in a detached machine part falling in the material flow through the chute. The high flexibility of the main body of the funnel element avoids build-up of sticky process materials on the internal surface of the chute as the cone wall flexes freely to disturb any build-up causing it to dislodge and fall downwardly with the main flow of material. The subject invention is advantageous in that the weight of the build-up deposit on the inside surface of the flexible element greatly facilitates the flexing of the cone and provides self-detachment from the cone internal surface.

Optionally, the flexible funnel element may be formed from a plurality of body pieces connected together to form a funnel shaped unitary assembly or may be formed from a single piece body. Optionally, the flexible element to be formed from 2, 3, 4, 5 or 6 pieces connected together via bonding, thermal welding, stitching, clips, pins, rivets or other mechanical attachments.

Optionally, a radial thickness of a wall of the flexible funnel element may be substantially uniform along a full axial length of the funnel element or may be non-uniform. Optionally, the wall thickness may be greater at or towards one axial end relative to the opposite end. Optionally, the change in the wall thickness may be gradual or may be a step change. Similar configurations of wall thickness (uniform or non-uniform) also apply to the holder funnel element. Optionally, a wall thickness of the flexible funnel element is greater than a wall thickness of the holder funnel element. The wall thickness of the flexible element is dependent upon the constituent material and may be adjusted to suit different applications and material feed types.

Accordingly to a second aspect of the present invention there is provided a funnel section to form a part of a material guide chute, the funnel section comprising: a flexible funnel element as claimed herein; a holder funnel element releasably attachable to the flexible funnel element to form an axially extending assembly; wherein the flexible funnel element comprises: a flexibility and an axial length greater than the holder funnel element; a radial facing surface positionable against a radial facing surface of the holder funnel element to allow the flexible and holder funnel elements to be interconnected axially to form the funnel section; at least one connection element provided respectively at the flexible funnel element and the holder funnel element to cooperatively engage and connect the flexible and holder funnel elements axially.

Optionally, an axial length of the holder funnel element is 10 to 50%; 15 to 45%; 20 to 35%; 22 to 30% or 23 to 27% of an axial length of the flexible funnel element. Such an arrangement is advantageous to provide the majority of the length of the flexible element is presented in the material flow path and to avoid material contacting the internal facing surface of the holder element that may otherwise be susceptible to material build-up.

Optionally, the funnel section further comprises a guide ring mountable at an inlet end of the holder funnel element, the guide ring comprising at least one attachment element to enable the funnel section to be mounted to an auxiliary support structure and/or other funnel sections forming part of the guide chute. The guide ring may be formed integrally or non-integrally with the holder element. Preferably, the guide ring is formed from a first material and the holder element is formed from a second material. Optionally, the flexible element is formed from a third material different from the first and second materials. Further, the second and third materials comprise polymer materials whilst the first material of the guide ring may be formed from a metal such as steel and/or may comprise polymer components. Optionally, the funnel section may further comprise a strap or brace to extend externally around the flexible and holder funnel elements so as to assist the releasable locking of the two components together.

Accordingly to a third aspect of the present invention there is provided a material guide chute to provide a conduit for the transfer of material comprising a plurality of the funnel sections as claimed herein.

Accordingly to a fourth aspect of the present invention there is provided a holder funnel element to form part of a funnel section of a material guide chute, the funnel element configured to mount a flexible funnel element forming part of the funnel section and comprising: a flexibility and an axial length less than the flexible funnel element; a radial facing surface positionable against a radial facing surface of the flexible funnel element to allow the holder funnel element and the flexible funnel element to be interconnected axially to form the funnel section; and at least one connection element to radially engage a cooperative connection element at the flexible funnel element to releasably attach the flexible funnel element to the holder funnel element.

BRIEF DESCRIPTION OF DRAWINGS

A specific implementation of the present invention will now be described, by way of example only, and with reference to the accompanying drawings in which.

DETAILED DESCRIPTION OF PREFERRED EMBODIMENT OF THE INVENTION

Figure 1:
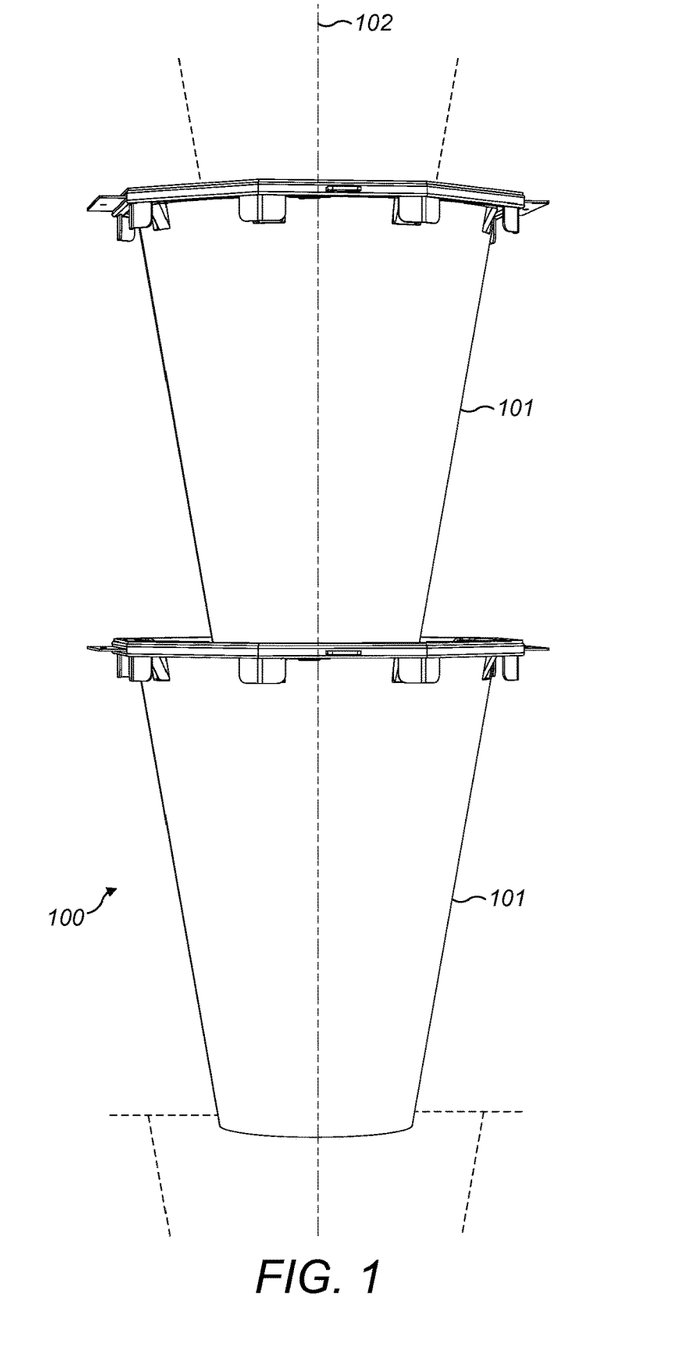
FIG. 1 is an external perspective view of a bulk material guide chute formed from a plurality of telescopically arranged funnel sections according to a specific implementation of the present invention.

A bulk material guide chute 100 comprises a plurality of axially arranged funnel sections 101. Each funnel section 101 comprises a generally truncated cone shape profile having a larger input end diameter relative to a smaller outlet end diameter, each section 101 being centred on a longitudinal axis 102 extending through chute 100. Each respective outlet end is configured to sit radially inside a respective inlet end of a neighbouring funnel section with the two opposed ends overlapping axially such that material is capable of falling through the guide chute to be contained and directed by the telescopically arranged funnel sections 101.

Figure 2:
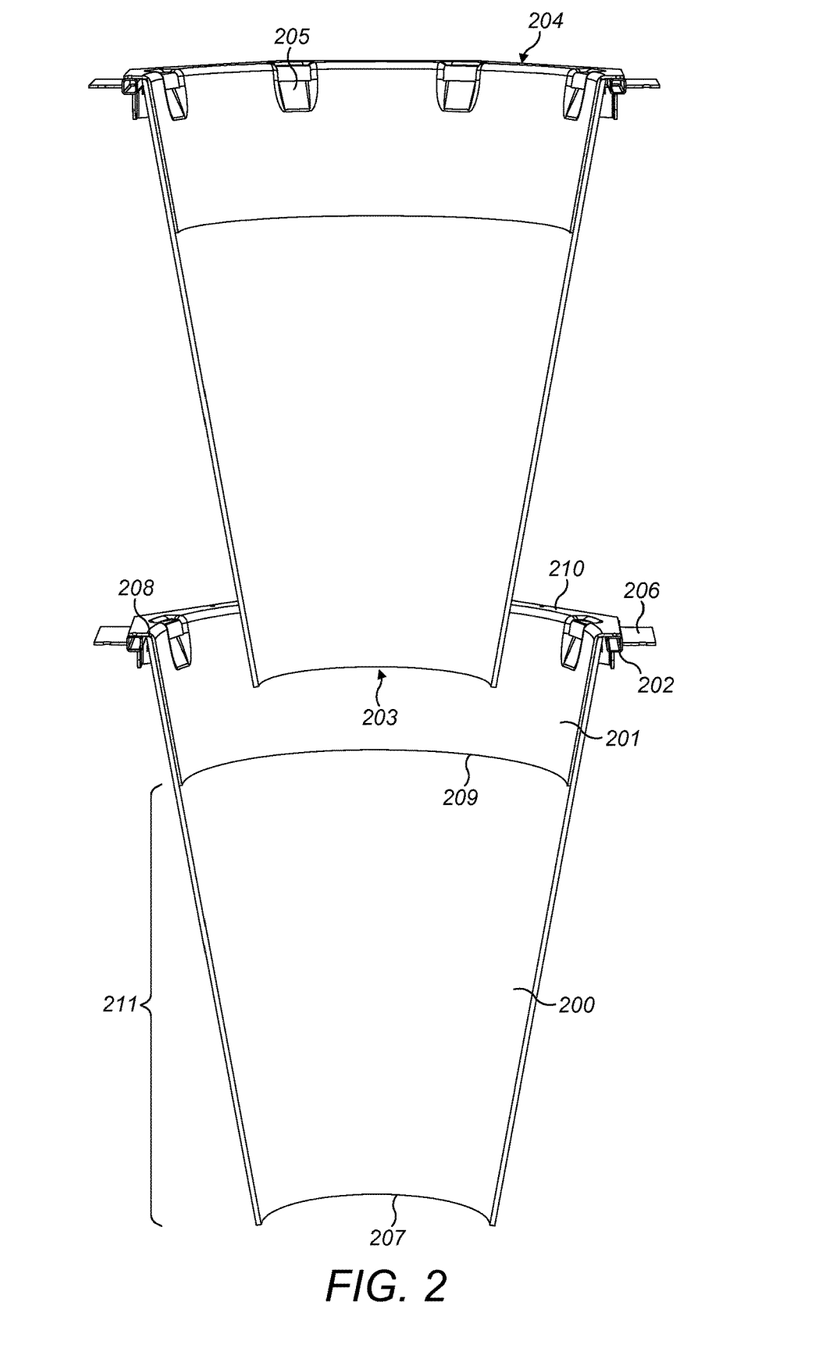
FIG. 2 is a partial cross section through the funnel sections of FIG. 1.

Referring to FIG. 2, each funnel section 101 is formed as a modular, composite in which separate components are assembled together to form a unitary structure. In particular, each funnel section 101 comprises a flexible funnel element 200 releasably mounted at a holder funnel element 201 that is in turn releasably mounted at a guide ring 202. Both the flexible and holder elements 200, 201 comprise a truncated cone shaped profile that are configured to overlay one another axially to define funnel section inlet 204 and funnel section outlet 203. In particular, the conical flexible element 200 comprises an annular outlet end 207 and are corresponding annular inlet end 208. The conical holder element 201 similarly comprises a first annular end 209 and a second (inlet) end 210. An axial length of the flexible element 200 is appreciably greater than a corresponding axial length of holder element 201 such that flexible element 200 defines the majority of the axial length of funnel section 101 between the inlet and outlet 204, 203. Flexible element 200 is mounted to extend over and about holder element 201 such that the respective inlets 208, 210 are aligned axially. Due to the relative difference in the axial lengths, the outlet 207 of flexible element 200 is axially separated from the first end 209 of the holder element 201 to define an axial section 211 that represents the exposed material contact region of funnel section 101.

Guide ring 202 extends radially around holder element 201 at the region of the axially co-aligned inlets 208, 210. Guide ring 202 comprises a plurality of radially outward extending flanges 206 configured to provide suitable mounting regions to support or suspend guide chute 100 at an auxiliary support structure (not shown) and to interconnect the funnel sections 101 axially to form the unitary telescopic arrangement of FIG. 1.

According to the specific implementation of the present invention, guide ring 202 comprises a generally rigid structure that may be formed from a metal, such as a steel or a suitable polymer having a desired hardness/rigidity. Holder element 201 comprises a second material having a desired hardness/rigidity to support the mounting of the flexible element 200 and to maintain the annular and truncated cone shape profile at the inlet 204 as material falls through the guide chute 100 and against each material contact section 211. In particular, each holder element 201 comprises a material or material composition having a hardness/rigidity being greater than that of the material or material composition of each corresponding flexible element 200. According to the specific implementation, the holder element 201 comprises a Shore D hardness of 40 to 60° whilst the flexible element 200 comprises a Shore A hardness of 40 to 90° according to ASTM D2240 testing standard. Accordingly, flexible element 200 comprises a material that freely distorts so as to bend, flex and twist in use and be capable of folding for transport and to facilitate stacking when not in use. Holder element 201 in contrast comprises a material or composition to impart structural support to the flexible element 200 and to prevent flexible element 200 deflecting laterally at the region of inlet 204 so as to ensure material is transferred downwardly into each successive funnel section 101. The present funnel sections 101 comprise regions with a desired rigidity to establish and maintain a robust chute construction whilst comprising regions with enhanced flexibility to prevent blockage or the accumulation of material within the funnel sections 101. Such advantages are provided by configuration and in particular the flexibility/hardness of the flexible element 200 relative to the holder element 201. In one aspect, flexible element 200 comprises a third material being different to the material of holder element 201 and guide ring 202.

Figure 3:
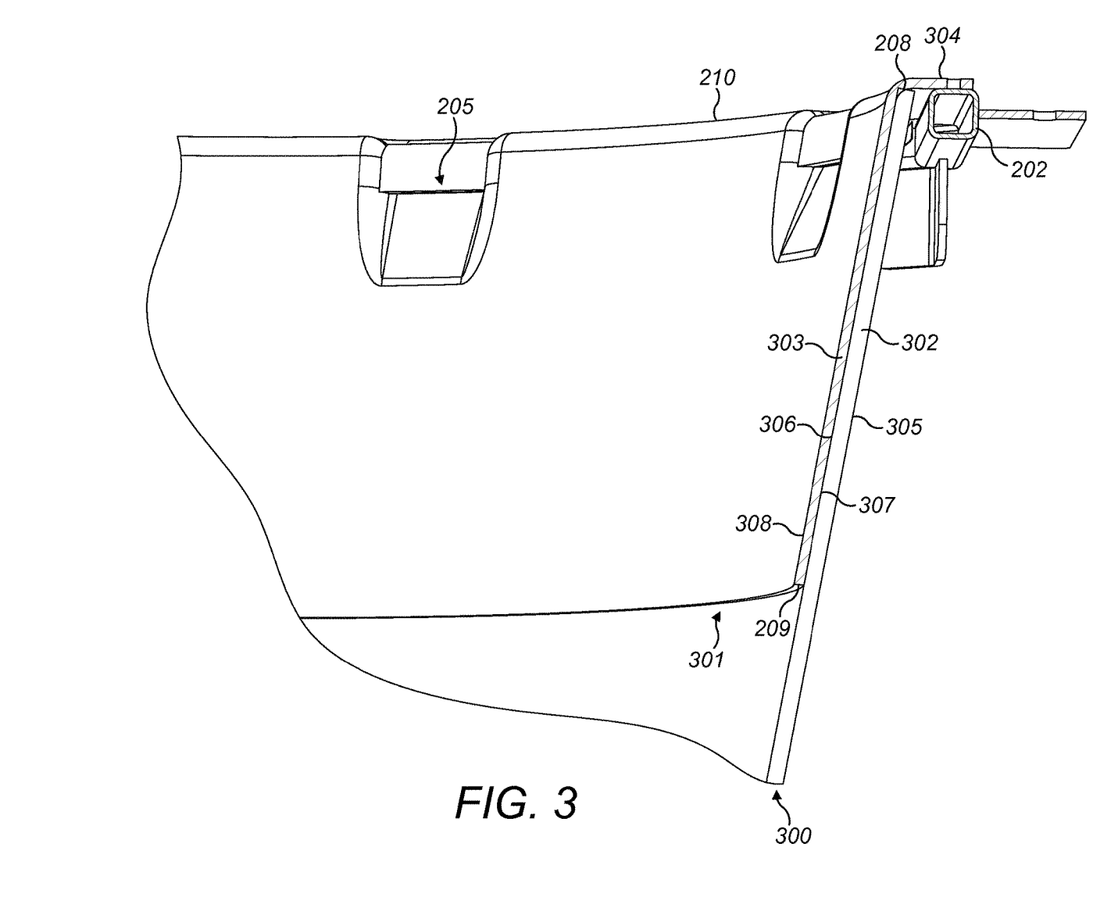
FIG. 3 is a partial cross section through an inlet region of one of the funnel sections of FIG. 2.

Funnel sections 101 may be maintained at their perspective positions as illustrated in FIG. 1 via axially extending chains, cables, straps and/or a sheath (not shown) optionally attached to each funnel section 101 via guide ring flanges 206. According to the specific implementation, flexible element 200 is mounted externally around holder element 201 in close touching contact. In particular, flexible element 200 comprises a main body indicated generally by reference 300 that defines a wall 302 of the cone having an external facing surface 305 and an internal facing surface 306. Similarly, holder element 201 comprises a main body indicated generally by reference 301 that defines a wall 303 of the cone having an external facing surface 307 and an internal facing surface 308. The internal surface 306 of flexible element 200 is positioned against the external surface 307 of holder element 201 over the full axial length of the holder element 201 between outlet end 209 and inlet 210. The inlet 210 of holder element 201 is terminated by a radially outward extending annular flange 304. Flange 304 is configured to sit against guide ring 202 in touching contact such that flexible element 201 may be suspended at guide ring 202 via the intermediate connected holder element 201.

Figure 4:
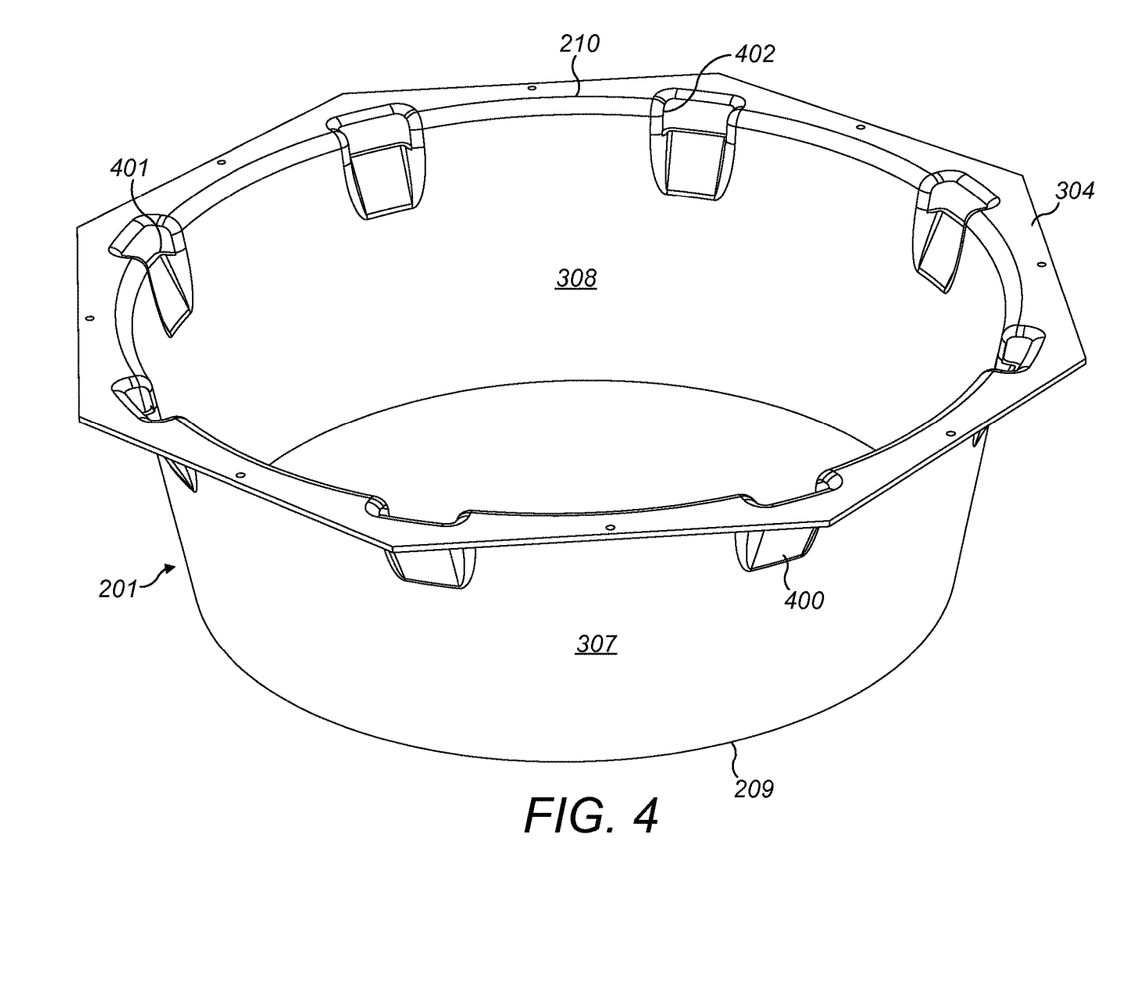
FIG. 4 is a perspective view of a holder funnel element forming part of the funnel section of FIG. 3.
Figure 5:
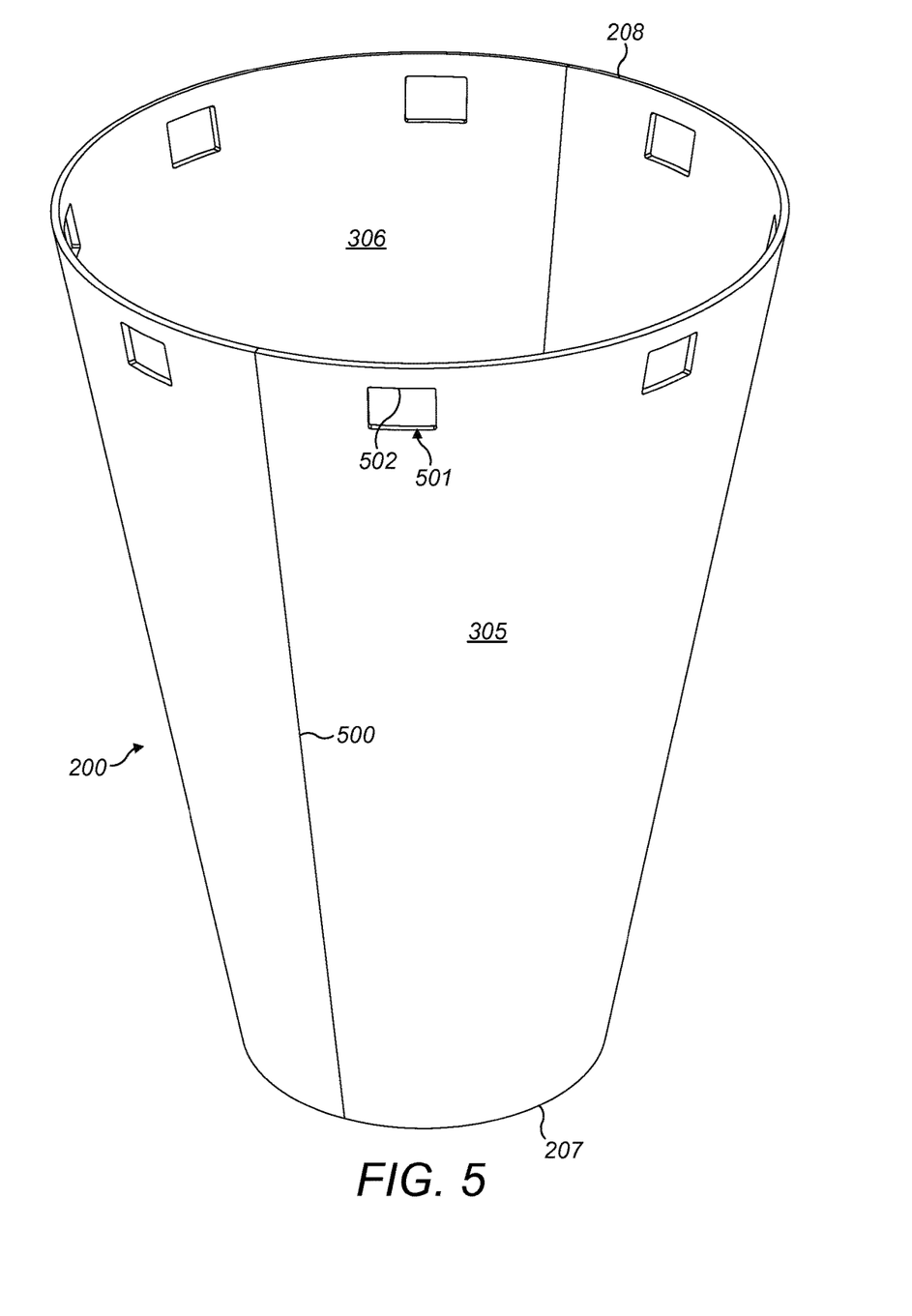
FIG. 5 is a perspective view of a flexible funnel element forming part of the funnel section of FIG. 3.

Referring to FIGS. 3, 4 and 5, flexible element 200 is axially releasably mounted at holder element 201 via a plurality of connection elements indicated generally by reference 205. In particular, the frusto-conical holder element 201 comprises a plurality of projections 400 extending radially outward from wall 303 to define radially flared abutment flanges circumferentially spaced apart around holder element 201 immediately below flange 304. Each projection 400 comprises an upward facing leading edge 401. Holder element 201 comprises respective cut-out sections 402 positioned adjacent each edge 401 so that each edge 401 is exposed to sit radially outside wall 303 and external surface 307.

Referring to FIG. 5, flexible element 200 is formed from two axially extending halves coupled together via their respective axially extending edges 500 to define the frusto-conical funnel shape. Flexible element 200 comprises a plurality of holes extending through wall 302 and positioned axially at or towards inlet 208. Holes 501 are spaced apart circumferentially by a distance corresponding to the circumferential spacing of holder element projections 400. Each hole 501 also comprises an uppermost straight edge 502 that, in part, defines hole 501. As the body 300 is mated against and around body 301, each respective projection 400 is configured to extend through each hole 501. Accordingly, the two funnel elements 201, 200 are coupled axially via the mating contact between each hole edge 502 and each projection leading edge 401. That is, the flexible element 200 is suspended over and about holder element 201 via projections 400 mating into holes 501. Each projection 400 is tapered radially outward from wall 303 such that during assembly, internal surface 306 is capable of sliding over the external surface 307 of holder element 201 including the axial length of each projection 400 until the projections 400 are received with the holes 501.

Figure 6:
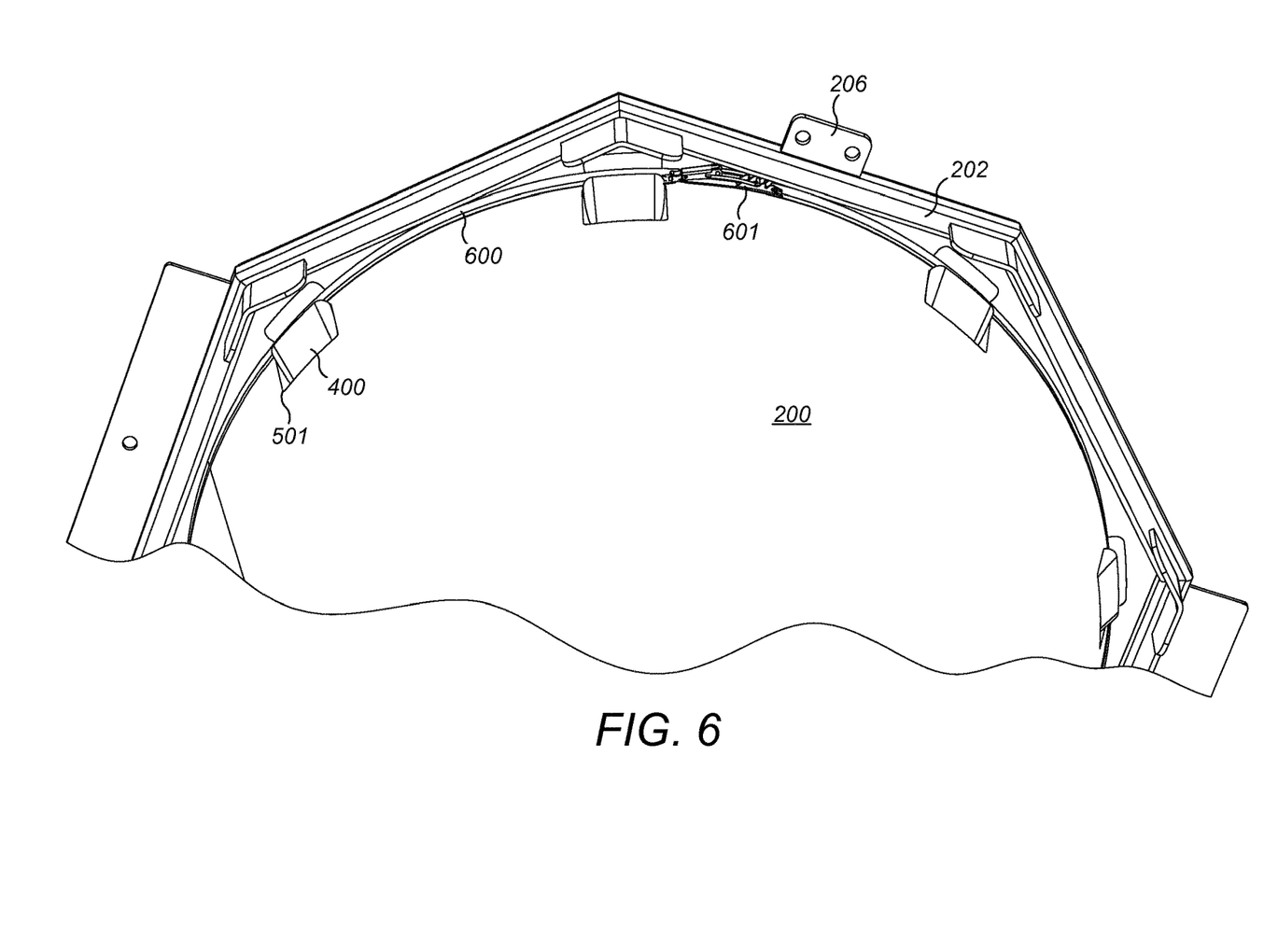
FIG. 6 is a perspective view of the inlet region of the funnel section of FIG. 3 illustrating a securement brace to secure the flexible funnel element of FIG. 5 to the holder funnel element of FIG. 4 according to a specific implementation of the present invention.
Figure 7:
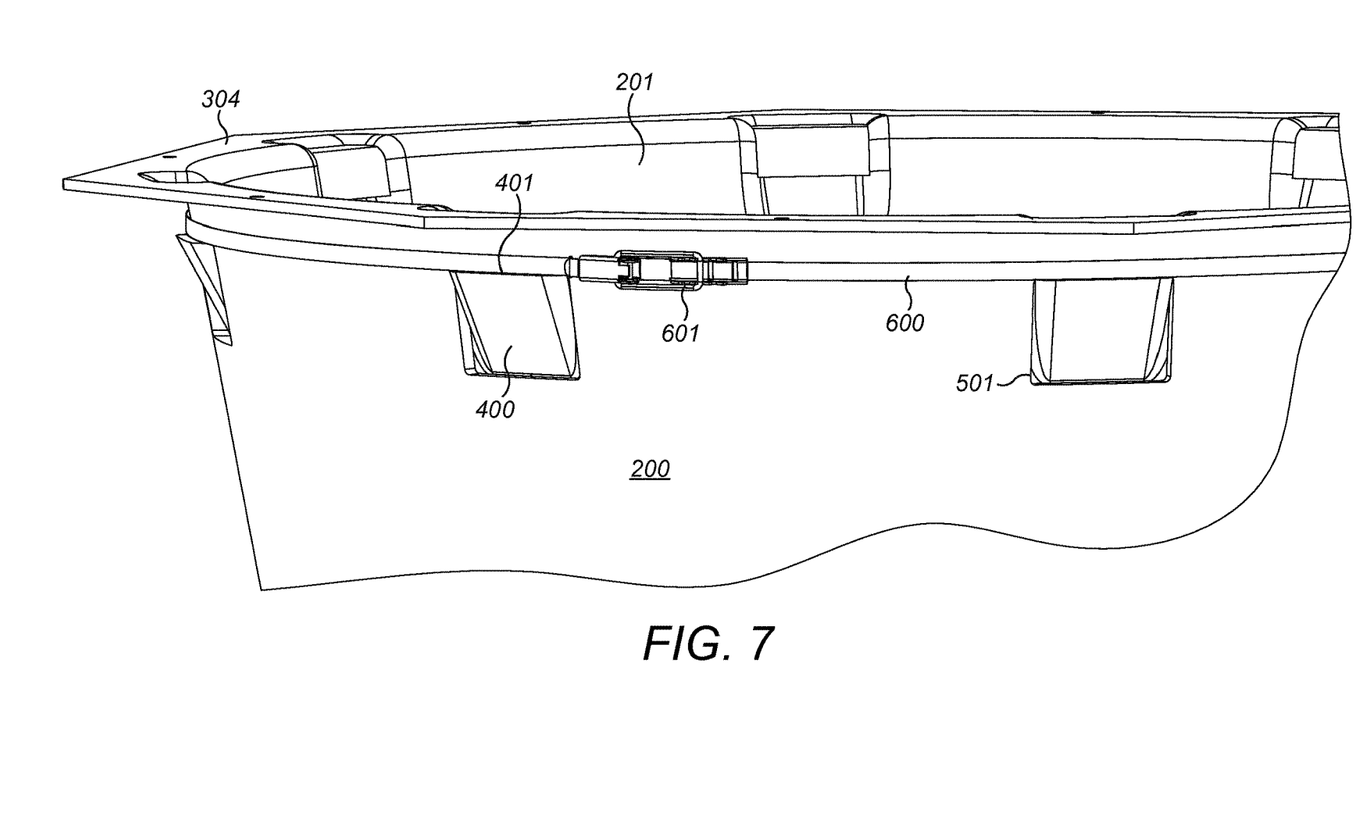
FIG. 7 is a first perspective view of an inlet end of the flexible funnel element of FIG. 5

Referring to FIGS. 6 and 7, the axial coupling of flexible element 200 at holder element 201 is further secured by an externally mounted brace 600 positioned to extend radially around flexible element external surface 305 at an axial position immediately above each hole 501. The strap-like brace 600 is also positioned to extend to be in contact with leading edge 401 of each projection 400 and functions to retain radially body 300 against body 301 at the region of holes 501 and projections 400. Brace 600 is secured releasably at the region of inlet 204 of funnel section 101 via a releasable buckle 601. According to the specific implementation, brace 600 comprises a metal such as steel. However, according to further embodiments, brace 600 may comprise a polymer material having a hardness/rigidity being similar to that of holder element 201.

According to the specific implementation, a radial thickness of the wall 302 of body 300 is greater than the corresponding radial thickness of wall 303 of body 301. Accordingly, the flexible element 200 is adapted as a flexible wear part to withstand abrasive contact with bulk material as it falls generally vertically through the guide chute 100 and in contact with the internal facing surface 306 within axial section 211. As illustrated in FIG. 2, as the outlet 203 of each neighbouring section 101 axially overlaps to sit within the two axial ends 209, 210 of holder element 201, the falling material, in general, does not contact holder element internal surface 308. Instead, the material is guided vertically downward by contact with axial section 211 that is defined exclusively by the flexible element 200. Accordingly the service lifetime of holder element 201 may be greater than flexible element 200 that functions as a wear part.

Figure 8:
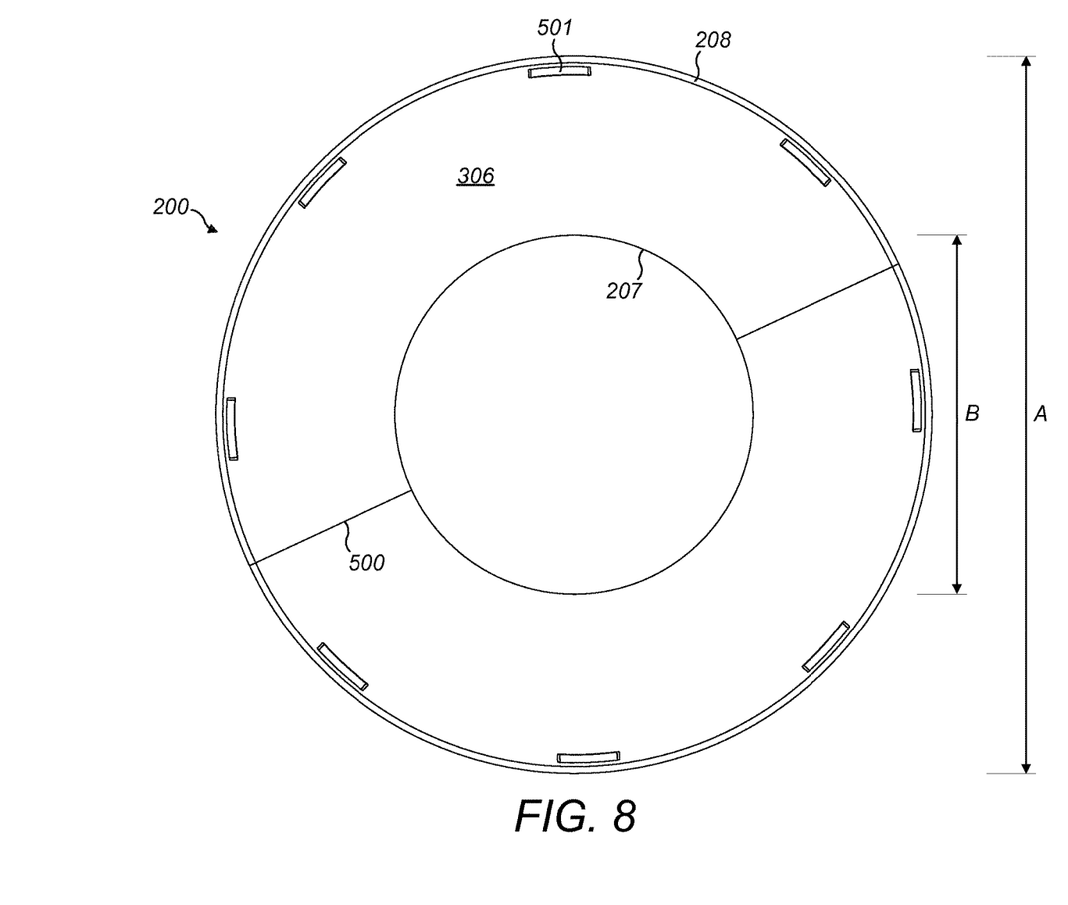
FIG. 8 is second perspective view of the inlet end of the flexible funnel element of FIG. 5.
Figure 9:
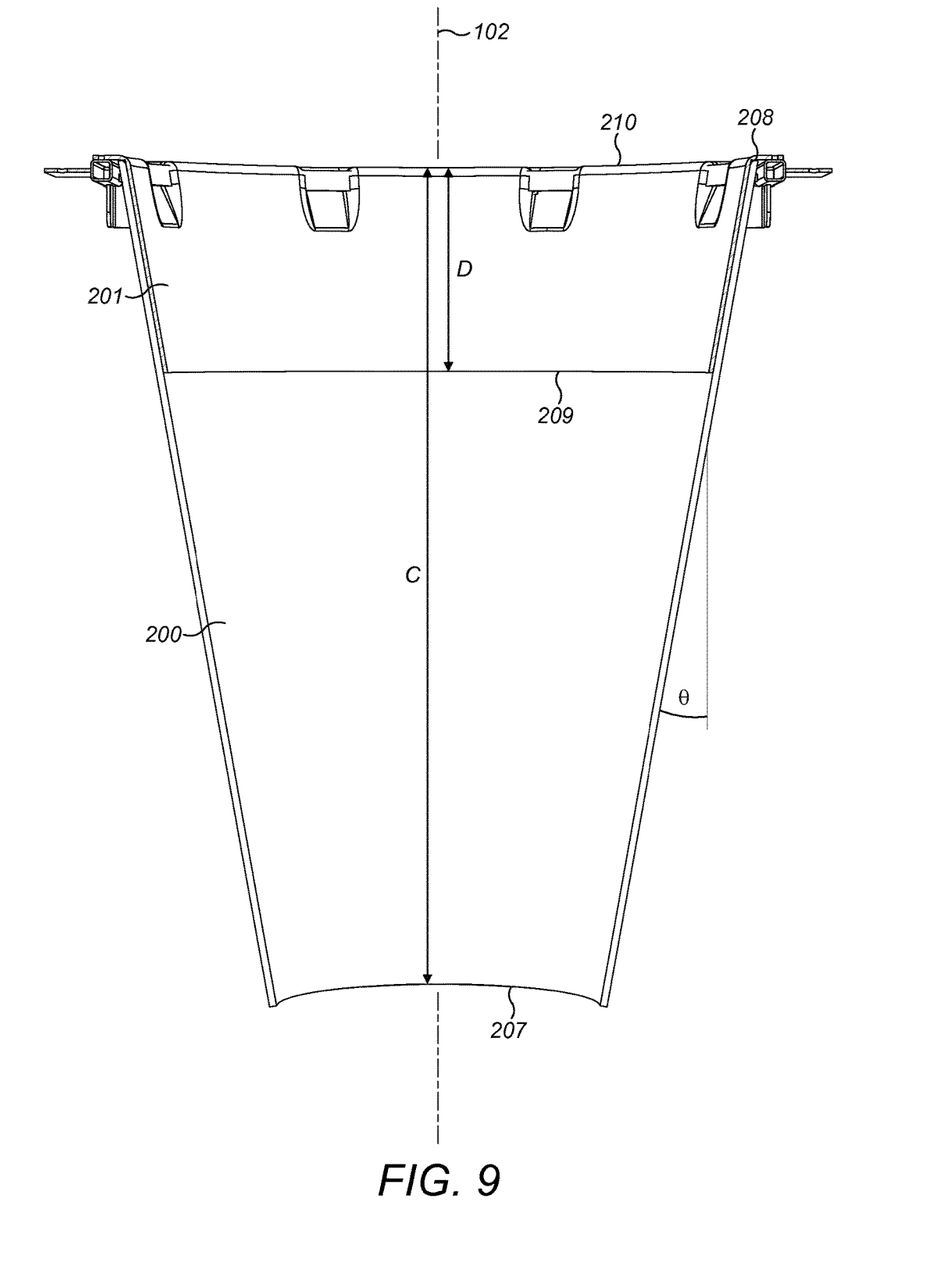
FIG. 9 is a further partial cross section of one of the funnel sections of FIG. 2.

Referring to FIG. 8, a diameter A of the conical flexible element inlet 208 is greater than a diameter B of the corresponding cone outlet 207. In particular, diameter B is the range 40 to 45% of diameter A. Accordingly, and referring to FIG. 9 an angle θ by which walls (302, 303) of the flexible and holder elements 200, 201 taper relative to axis 102 is in the range 5 to 15°. An axial length C of flexible element 200 between inlet and outlet 208, 207 is greater than a corresponding axial length D of holder element 201 between respective axial ends 209, 210. In particular, length D is the range 10 to 50% and in particular 20 to 30% of axial length C. Accordingly, approximately 60 to 70% of the axial length C of flexible element 200 is exposed to contact material falling through chute 100. As such, the majority of the funnel sections 101 are configured to deform and flex relative to axis 102 to prevent material accumulating and blocking chute 100. The flexible and lightweight body 300 when not in use may be folded easily for convenient packaging and transport. Flexible body 300 also facilitates compact storage of chute 100 when not in use as sections 101 may be collapsed axially.

The present multi-component funnel sections 101 are advantageous to allow the convenient separation of the component parts for recycling and to optimise the mechanical and physical properties of the different components 200, 201, 202 with regard to flexibility, rigidity, wear resistance and load bearing capability. The present modular construction also accommodates different configurations of conical sections 101. For example, the wear rate of the flexible element 200 may be adjusted by variation of the radial thickness of flexible element wall 302 and the choice of constituent material or material composition. Similar design variation is also possible by selective adjustment of a corresponding radial thickness and/or axial length wall 303 of holder element 201.

According to further specific implementations, guide ring 202 may be encapsulated or partially encapsulated within holder element 201 during manufacture and in particular moulding. For example, the holder ring 202 may be formed integrally within the holder element 201 including in particular flange 304 that may extend to envelope guide ring 202.

The invention claimed is:

1. A flexible funnel element arranged to form part of a funnel section of a material guide chute, the funnel element being mountable at a holder funnel element forming part of the funnel section and comprising:
   a flexibility and an axial length greater than that of the holder funnel element;
   a radial facing surface arranged to be positioned against a radial facing surface of the holder funnel element to allow the flexible funnel element and the holder funnel element to be interconnected axially to form the funnel section; and
   at least one connection element arranged to radially engage a cooperative connection element at the holder funnel element to releasably attach the flexible funnel element to the holder funnel element, the holder funnel element having a hardness that is greater than a hardness of the flexible funnel element.

2. The funnel element as claimed in claim 1, wherein a radially inward facing surface of the flexible funnel element is arranged to be positioned against a radially outward facing surface of the holder funnel element to allow the flexible and holder funnel elements to be interconnected axially.

3. The funnel element as claimed in claim 1, wherein the connection element includes a plurality of holes formed through the flexible funnel element arranged to receive a plurality of projections extending radially at the holder funnel element.

4. The funnel element as claimed in claim 1, further comprising an inlet end axially separated from an outlet end, a diameter of the inlet end being greater than a diameter of the outlet end.

5. The funnel element as claimed in claim 4, wherein the holder funnel element includes an inlet end axially separated from an outlet end, a diameter of the inlet end being greater than a diameter of the outlet end and wherein the diameter of the inlets of the flexible and holder funnel elements are substantially equal to allow the funnel elements to be connected together at or towards the axial position of the inlets.

6. The funnel element as claimed in claim 4, wherein the funnel element has a truncated cone shaped profile.

7. The funnel element as claimed in claim 6, wherein an angle by which a wall of the cone extends relative to a longitudinal axis of the flexible funnel element is in the range of 3 to 30°.

8. The funnel element as claimed in claim 1, comprising a Shore A hardness of 30 to 100°.

9. The funnel element as claimed in claim 1, comprising a plurality of body pieces connected together to form a funnel shaped unitary assembly.

10. The funnel element as claimed in claim 1, comprising a single piece body.

11. A funnel section arranged to form a part of a material guide chute, the funnel section comprising:
a flexible funnel element; and
a holder funnel element releasably attached to the flexible funnel element to form an axially extending assembly, wherein the flexible funnel element has a flexibility and an axial length greater than the holder funnel element, the flexible funnel element including a radial facing surface arranged to be positioned against a radial facing surface of the holder funnel element such that the flexible and holder funnel elements are interconnected axially to form the funnel section and at least one connection element provided respectively at the flexible funnel element and the holder funnel element to cooperatively engage and connect the flexible and holder funnel elements axially, the holder funnel element having a hardness that is greater than a hardness of the flexible funnel element.

12. The funnel section as claimed in claim 11, wherein the flexible funnel element has a Shore A hardness in the range 30 to 100° and the holder funnel element has a Shore D hardness in the range 30 to 70°.

13. The funnel section as claimed in claim 11, wherein an axial length of the holder funnel element is 10 to 50% of an axial length of the flexible funnel element.

14. The funnel section as claimed in claim 11, further comprising a guide ring mounted at an inlet end of the holder funnel element, the guide ring having at least one attachment element arranged to enable the funnel section to be mounted to an auxiliary support structure and/or other funnel sections forming part of the guide chute.

15. A material guide chute arranged to provide a conduit for the transfer of material, the guide chute comprising a plurality of the funnel sections as claimed in claim 11.

* * * * *